(12) United States Patent
Wu

(10) Patent No.: US 6,373,316 B1
(45) Date of Patent: Apr. 16, 2002

(54) DIGITAL COSINE AND SINE MULTIPLICATION CIRCUITS

(75) Inventor: Miaochen Wu, Acton, MA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/484,358

(22) Filed: Jan. 18, 2000

(51) Int. Cl.[7] .................................................. G06F 7/44
(52) U.S. Cl. ...................................... 327/356; 708/276
(58) Field of Search ................................ 327/105, 107, 327/113, 114, 116, 119, 120, 121, 355, 356, 106; 365/7.8; 377/47, 48; 708/271, 272, 276

(56) References Cited

U.S. PATENT DOCUMENTS

| | | | | |
|---|---|---|---|---|
| 3,735,110 A | * | 5/1973 | LeComte | 708/440 |
| 4,130,876 A | * | 12/1978 | Mitsuhashi | 708/276 |
| 4,827,442 A | * | 5/1989 | Mehrgardt | 708/276 |
| 4,870,606 A | * | 9/1989 | Sasahara | 708/276 |
| 4,888,719 A | * | 12/1989 | Yassa | 424/480 |
| 5,113,361 A | * | 5/1992 | Damerow et al. | 708/276 |
| 5,187,677 A | * | 2/1993 | Kovalick | 708/276 |
| 5,276,633 A | * | 1/1994 | Fox et al. | 708/276 |
| 5,467,294 A | * | 11/1995 | Hu et al. | 708/276 |
| 5,822,376 A | * | 10/1998 | Renard | 375/316 |
| 5,954,787 A | * | 9/1999 | Eun | 708/276 |

OTHER PUBLICATIONS

Richard Schreier and W. Martin Snelgrove, Decimation for Bandpass Sigma–Delta Analog–to–Digital Conversion, 1990, pp. 1800–1804.
Stephen A. Jantzi, et al., A Fourth–Order Bandpass Sigma–Delta Modulator, 1993, pp. 282–291.
Lorenzo Longo, et al., A 15b 30kHz Bandpass Sigma–Delta Modulator, IEEE International Solid–State Circuits Conference, 1993 pp. 226–229.
Frank W. Singor, et al., Switched–Capacitor MBandpass Delta–Sigma A/D Modulation at 10.7 MHz, IEEE Journal of Solid–State Circuits, 1995, pp. 184–192.
Weinan Gao, et al., A 950MHz SecondOrder Integrated LC Bandpass Modulator, Symposium on VLSI Circuits Digest of Technical Papers, 1997, pp. 111–112.

* cited by examiner

Primary Examiner—Kenneth B. Wells
Assistant Examiner—Hai L. Nguyen
(74) Attorney, Agent, or Firm—Connolly Bove Lodge & Hutz LLP.; Joseph P. Abate

(57) ABSTRACT

By sampling at six times the carrier frequency cosine and sine multiplication circuits are found to be constructable from simple shift and inversion circuit. Shifting and inversion are controlled by means of a simple finite state machine or other circuits cycling through a six cycle periodic sequence.

9 Claims, 4 Drawing Sheets

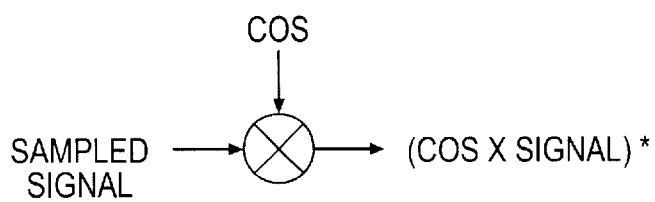
FIG. 1
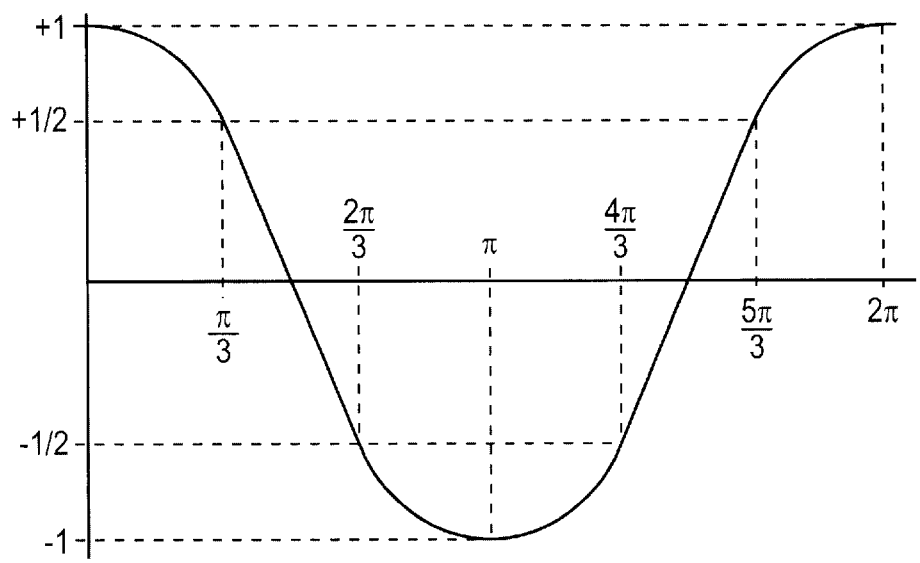
FIG. 2
| X | COS X | 2 COS X | MUX #1 | MUX #2 |
|---|---|---|---|---|
| 0 | 1 | +2 | SHIFT LEFT | NO INVERT |
| $\pi/3$ | 1/2 | +1 | NO SHIFT | NO INVERT |
| $2\pi/3$ | -1/2 | -1 | NO SHIFT | INVERT |
| $\pi$ | -1 | -2 | SHIFT LEFT | INVERT |
| $4\pi/3$ | -1/2 | -1 | NO SHIFT | INVERT |
| $5\pi/3$ | 1/2 | +1 | NO SHIFT | NO INVERT |
| $2\pi$ | 1 | +2 | SHIFT LEFT | NO INVERT |
FIG. 3

| X | COS X | (2/√3) SIN X | MUX SELECT |
|---|---|---|---|
| 0 | 0 | 0 | ZERO |
| π/3 | +√3/2 | +1 | NON-INVERTED |
| 2π/3 | +√3/2 | +1 | NON-INVERTED |
| π | 0 | 0 | ZERO |
| 4π/3 | −√3/2 | −1 | INVERTED |
| 5π/3 | −√3/2 | −1 | INVERTED |
| 2π | 0 | 0 | ZERO |

DIGITAL COSINE AND SINE MULTIPLICATION CIRCUITS

BACKGROUND OF THE INVENTION

The present invention is generally directed to digital circuits. More particularly, the present invention is directed to a digital circuit for multiplying a sampled digitized data input signal by the cosine or sine function.

In digital circuit applications it is often desirable to be able to multiply an input signal by the cosine or sine function. This is particularly desirable in the manipulation of digitized radio frequency signals wherein it is desirable to be able to produce in-phase and quadrature-phase signal components. Typically such multiplication is accomplished by the utilization of straight forward digital multiplication circuits. In general, digital multiplication can be a relatively complicated process requiring significant amounts of circuitry.

However, the present applicant has discerned that by utilization of a sampling rate which is six times the carrier frequency, it is possible to construct extremely simple cosine and sine multiplication circuits which require only a shifter and an inverter which are controlled to produce the desired cosine multiplication function.

SUMMARY OF THE INVENTION

A digital cosine multiplication circuit of the present invention comprises a digital shifting circuit which receives the sampled input signal. This shifting circuit supplies its output to a digital inverting circuit which produces the desired results. The multiplication circuit includes control means for selecting whether or not the shifting circuit operates to shift by one bit position or not to shift at all. Additionally the control means operates to control whether or not the digital inverting circuit produces an inverted or a non-inverted output. Several different embodiments for this circuit are illustrated. In particular, one such embodiment is implemented by means of a pair of multiplexor circuits.

As will be seen by an analysis of the relevant multiplication coefficients, the circuit is best implemented in the fashion described above. However, as a consequence of the arithmetic values of the coefficients it is clearly significantly easier to have multiplied the usually necessary coefficients by a factor of 2. Accordingly, this introduces an extra scaling factor in the output signal. However, this output signal scaling factor is 2 and accordingly, it is readily compensated for by means of a simple shifting circuit. This shifting circuit is optional depending on the further digital signal processing applied to the result.

As will also be seen by an analysis of the sine function, the utilization of a sampling frequency which is sic times the carrier frequency also results in a set of multiplication which are easily implemented via very simple digital circuits. In fact, except for an amplitude factor which is typically not relevant for subsequent processing, the sine circuit is implementable with only an inverter and a multiplexor with an appropriate multiplexor controller.

Accordingly, it is an object of the present invention to provide circuits for digital multiplication involving the sine and cosine functions.

It is yet another object of the present invention to simplify the construction of digital circuits using which require in phase and quadrature-phase signals.

It is a still further object of the present invention to simplify the construction of certain digital multiplication circuits.

It is yet another object of the present invention to provide a simple and fast mechanism for sine and cosine multiplication.

The recitation herein of a list of desirable objects which are met by various embodiments of the present invention is not meant to imply or suggest that any or all of these objects are present as essential or necessary features, either individually or collectively, in the most general embodiment of the present invention or in any of its more specific embodiments.

DESCRIPTION OF THE FIGURES

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 1 is a simplified schematic view illustrating the overall operation of a digital cosine multiplier circuit in accordance with the present invention;

FIG. 2 is a plot of the cosine function with particular reference to the situation in which the sampling frequency is six times the carrier frequency of the sampled input signal;

FIG. 3 is a table illustrating values of the cosine function and its doubled value together with appropriately selected values for multiplexor control output;

DETAILED DESCRIPTION OF THE INVENTION

In accordance with the present invention a sampled digital signal is supplied to a cosine multiplication circuit. It is assumed herein that this input signal is sampled at a rate which is six times the carrier frequency for that signal. The output of the operation illustrated in FIG. 1 is a signal which is a digital signal which represents the sampled input signal multiplied by a correspondingly sampled cosine function.

In particular, the present inventor has noted that if the sampling frequency is six times the underlying carrier frequency, the coefficients associated with cosine function multiplication become extremely simple. In particular, if this occurs it is seen from FIG. 2 that the cosine function takes on only 4 different values namely +1, +1/2, −1/2 and −1.

Attention is now directed to FIG. 3. If one doubles each of the previous cosine values, it is seen that the corresponding coefficients are (in sampled order): +2, +1, −1, −2, −1 and +1. Again only 4 different coefficient values are produced at this particular sampling rate. The significance of other columns in FIG. 3 will become apparent in the discussion below.

The coefficients illustrated in the second or third columns in FIG. 3 are particularly interesting. In particular, attention is focused on the coefficients found in the third column. It is seen that these coefficients represent either a digital inverting function or a multiplication by a factor of 2. These are particularly easily implemented functions in digital circuits. Inversions are accomplished by well known inverter circuits which will in general have a specific construction depending on the digital number format used. Likewise factors of two are accomplished generally not by adding two digital numbers together but rather by simply shifting left one bit position. Likewise digital inversion is an easily accomplished function. It may be accomplished by individual invertors or by a twos-complement inverter circuits depending upon the format of the digital representation of the sampled signals. In any event it is seen that the resulting coefficients shown in the third column of FIG. 3 yield circuits which are exceedingly easily implemented. The significance of the last two columns in FIG. 3 are more particularly explained below with reference to FIG. 4.

Figure 4:
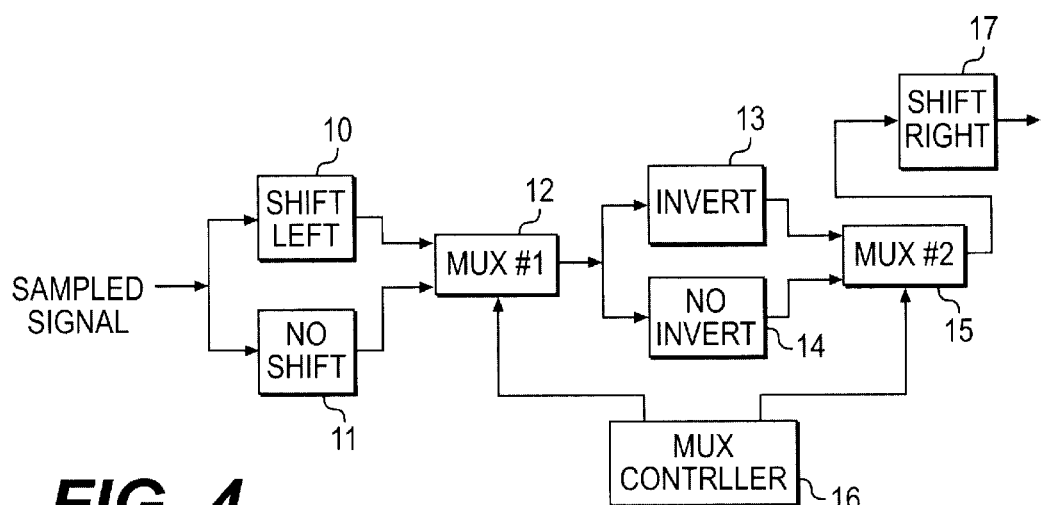
FIG. 4 is a functional block diagram illustrating one embodiment of the present invention.

FIG. 4 illustrates one embodiment of the present invention in which a sample digital input signal is supplied to SHIFT-LEFT device 10 and simultaneously to NO-SHIFT device 11. Such a device typically comprises merely a set of flip-flops for temporarily storing the sample digital signal bits for one clock cycle time. The output of SHIFT-LEFT circuit 10 or NO-SHIFT circuit 11 are supplied to multiplexor #1 (reference numeral 12). This multiplexor is controlled by MUX controller 16 whose operation is more particularly described below. The output of multiplexor #1 is supplied to INVERTER 13 or NON-INVERTER 14. NON-INVERTER 14 is likewise typically implemented as a temporary set of storage flip-flops for the bits present in the sampled digital signal. The output of INVERTER 13 and NON-INVERTER 14 are both supplied to multiplexor #2 (reference numeral 15). Likewise, this multiplexor is controlled in a coordinated fashion by MUX controller 16. If necessary a SHIFT-RIGHT circuit 17 is provided for correcting for the fact that the coefficients in the third column of FIG. 3 are multiplied by 2 to preserve circuit simplicity. However, as noted above SHIFT-RIGHT circuit 17 is optional depending upon further treatment of the sampled output cosine multiplied signal.

In order for the circuit in FIG. 4 to operate as a cosine multiplication function in accordance with the present invention MUX #1 is operated so as to first select the left shifted output signal from circuit 10. This signal is supplied to inverter 13 and at the same time MUX controller 16 controls MUX #2 to select the non-inverted input signal. This corresponds to a multiplication by +2 in accordance with the first line of the table in FIG. 3. Next MUX controller 16 selects the non-shifted signal from circuit 11 which is supplied to NON-INVERTER 14. And it is from circuit 14 that MUX controller 16 operates to control MUX #2 to select the non-inverted input signal. This corresponds to a multiplication by +1 in accordance with the second line of the table in FIG. 3. In a similar fashion in the next cycle MUX controller 16 operates to select the non-shifted output and the inverted output. This corresponds to a multiplication by −1. This multiplication is therefore seen to correspond to line 3 in the table of FIG. 3. Next MUX controller 16 operates to select the left shifted output from circuit 10 and also operates to select the inverted output signal from inverter 13. This corresponds to multiplication by a coefficient of −2. This corresponds to the fourth row of the table in FIG. 3. It has already been shown with respect to the fifth line of the table in FIG. 3 that this circuit then operates to multiply by −1 and corresponingly by +1 for the sixth line in the table in FIG. 3. Thus it is seen that all of the necessary cosine coefficients can be effectively generated in sequence and employed to multiply the sampled input signal.

Accordingly, it is seen that the functioning of MUX controller 16 is exceedingly simple: it merely needs to operate as a binary output device producing the sequence shown in the fourth column of the table in FIG. 3 for control of multiplexor #1. Similarly a binary output signal from MUX controller 16 corresponding to the sequence shown in the fifth column of FIG. 3 is supplied to multiplexor #2. These functions are readily accomplished by simple finite state machine devices or by any circuit operable to produce the sequences illustrated in FIG. 3.

Figure 5:
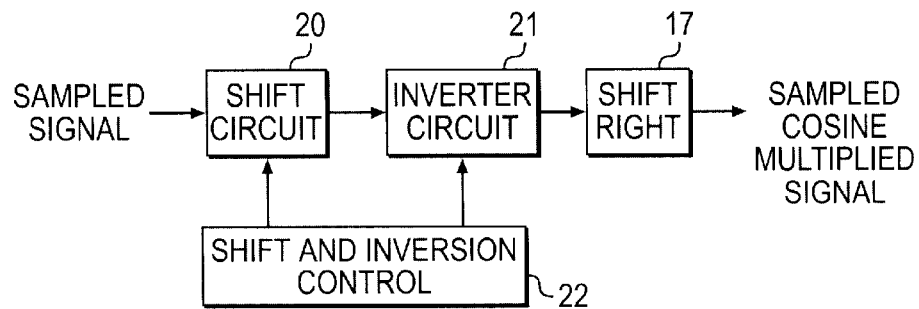
FIG. 5 is a block diagram illustrating yet another embodiment of the present invention for digital cosine multiplication circuits.

Another simple embodiment of the present invention is illustrated in FIG. 5. In this embodiment SHIFT circuit 20 is controllable to either shift the sample data input signal left by one bit position or to not shift it at all in response to a binary signal provided by SHIFT AND INVERSION CONTROL circuit 22. Likewise INVERTER circuit 21 is operable to either invert or to not invert the signal supplied from shift circuit 20 in accordance with a somewhat different binary signal supplied from SHIFT AND INVERSION CONTROL circuit 22. In point of fact SHIFT AND INVERSION CONTROL unit 22 and MULTIPLEXOR CONTROL UNIT 16 may in fact comprise the same circuitry. And again, if desired, a SHIFT-RIGHT function block 17 is provided in the event that it is desired to remove the factor of two scale introduced by using column 3 instead of column 2 of FIG. 3. INVERTER circuit 21 is also readily implemented as an EXCLUSIVE-OR circuit which can also be considered to act as a conditional inversion operation.

Figure 6:
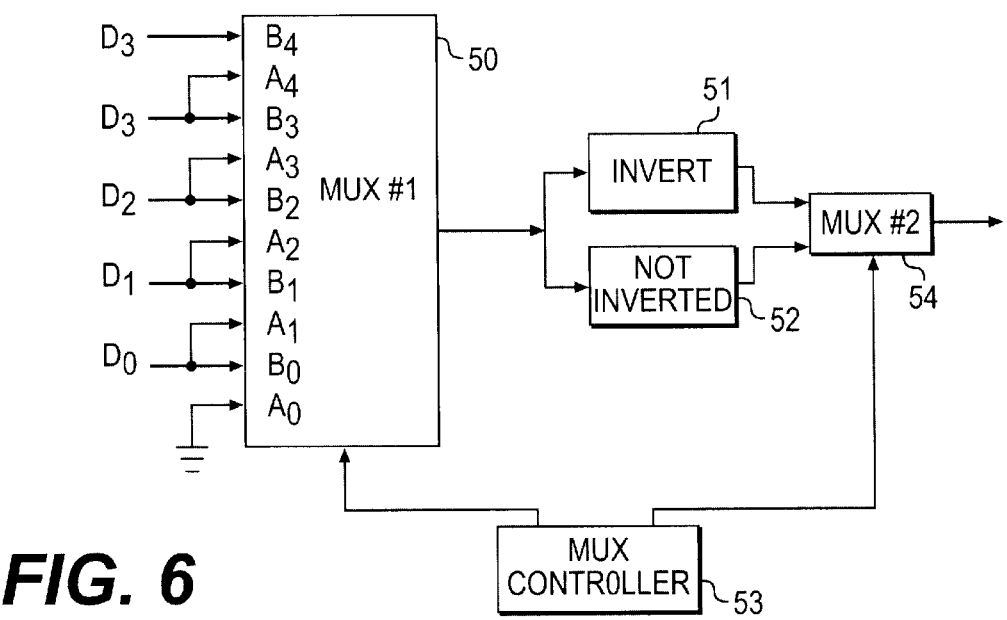
FIG. 6 is a functional block diagram illustrating an alternate circuit embodiment for carrying out cosine function multiplication.

FIG. 6 illustrates another embodiment for a cosine multiplier circuit. This circuit functions exactly the same as the circuit shown in FIG. 4 except that shifting is carried out in a single multiplexor circuit 50. Inverters 13 and 51, "non-inverters" 14 and 52, multiplexors 15 and 54 and MUX controllers 16 and 53 all function in the same way in their respective circuits.

Figure 7:
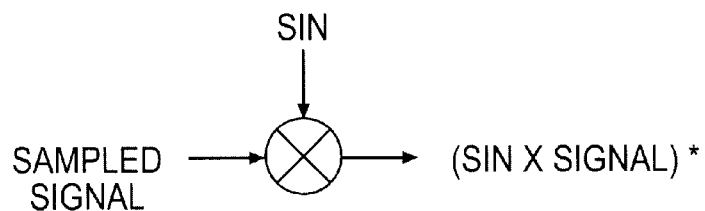
FIG. 7 is a simplified schematic view illustrating the overall operation of a digital sine multiplier circuit in accordance with the present invention.
Figure 8:
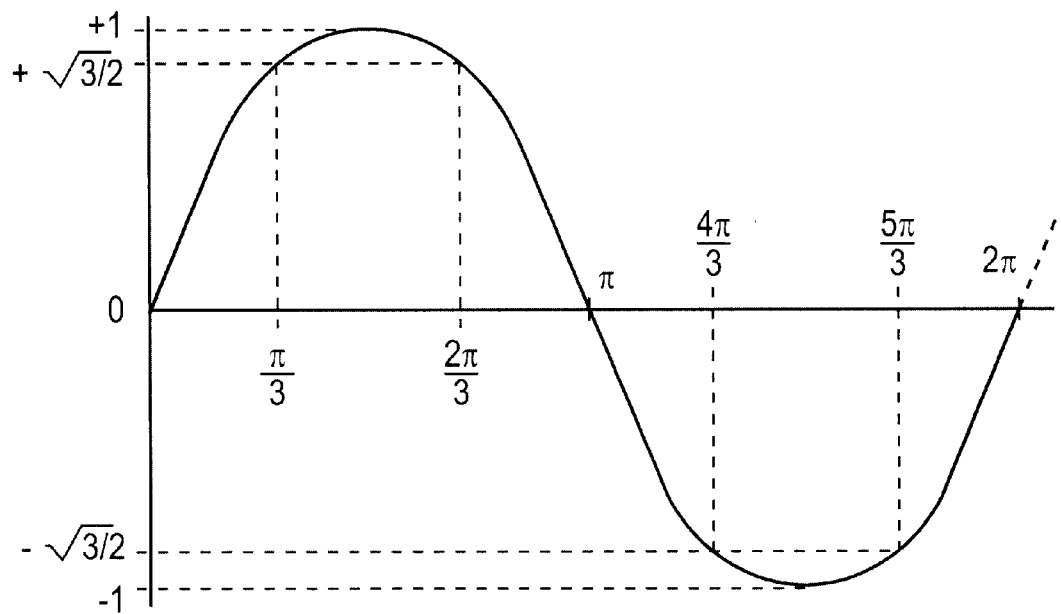
FIG. 8 is a plot of the sine function with particular reference to the situation in which the sampling frequency is six times the carrier frequency of the sampled input signal.
Figures 9, 10:
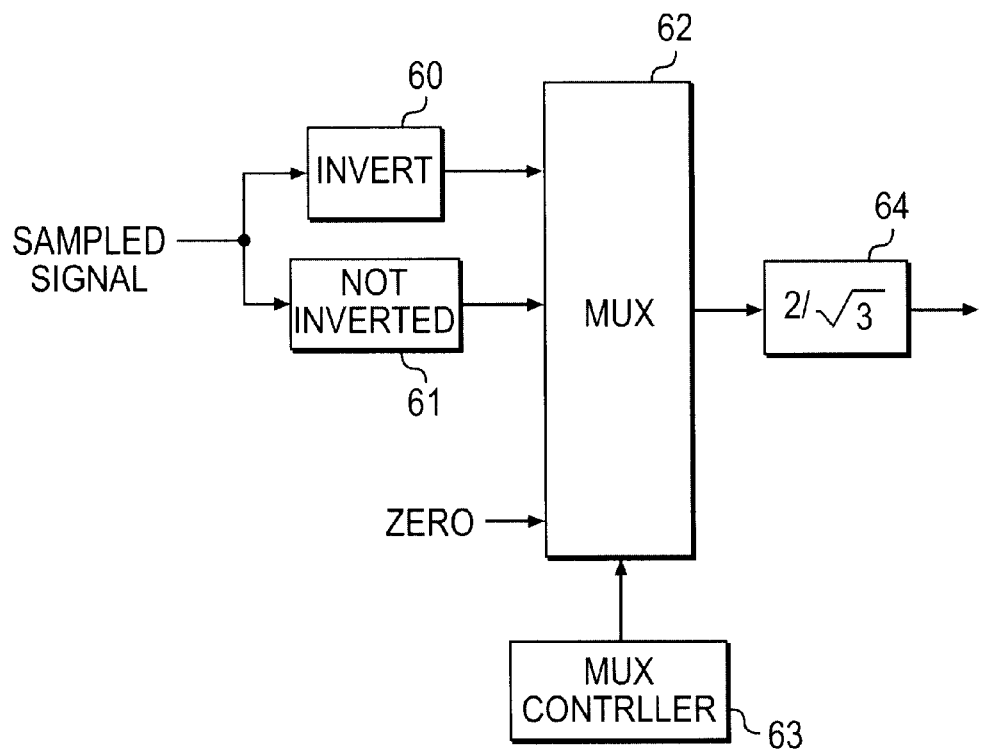
FIG. 9 is a table illustrating values of the sine function together with appropriately selected values for a multiplexor control circuit.
FIG. 10 is a block diagram illustration of a preferred embodiment of a digital circuit for performing sine function multiplication.

FIG. 7 provides the same overview for the sine multiplier as FIG. 1 does for the cosine multiplier. Likewise, FIG. 8 provides an illustration of the symmetry of result stemming from sampling frequency selection as applied to the sine function instead of the cosine function from FIG. 2, FIG. 9 illustrates the values of the sine function associated with the desired sampling rate. In terms of absolute value, after correction by an amplitude factor of $(2/\sqrt{3})$, it is seen that the sine value is either zero or one. This is even easier than the cosine result. Accordingly it is seen that, based on the multiplication aspect of the desired circuit one has only three multiplier values to select from: 0, −1 and +1. Theses are very easily implemented with a single multiplexor which receives normal and inverted digital signal inputs together with a fixed zero input. A circuit for carrying this out is shown in FIG. 10. MUX controller 63 operates in the sequence specified in the last column of FIG. 9 to control multiplexor 62 so as to select as output one of three inputs: the inverted input signal from inverter 60, the non-inverted signal from function block 61 (awire) and a constant zero input. As above scaling by a factor of $(2/\sqrt{3})$ in block 64 may optionally be performed if amplitude normalization is desired.

Accordingly, it is seen from the above that a simple, economical, fast operating circuit for multiplying sampled digital signals by the sine or cosine function is readily implementable and achieves all of the objects recited above.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A digital cosine multiplication circuit comprising:
   a digital shifting circuit receiving a sampled input signal;
   a digital inverting circuit receiving sampled output signal from said digital shifting circuit;
   control means for selecting either no shift or a single left shift for said digital shifting circuit and for selecting either no inversion or inversion for said inverting circuit, said shift and inversion selections being coordinated to produce a cosine multiplication of said sampled input signal.

2. The circuit of claim 1 further including a circuit for dividing the output of said inverter circuit in half.

3. The circuit of claim 2 in which said dividing circuit is a right shifter.

4. A digital cosine multiplication circuit comprising:
   a digital shifting circuit receiving a sample input signal;
   a digital inverting circuit receiving sampled output signals from said digital shifting circuit; and
   means for coordinating said shifting circuit and said inverting circuit so as to effect a cosine multiplication of said input signal.

5. A digital cosine multiplication circuit comprising:
   a digital left shift circuit for receiving a sampled input signal;
   a first multiplexor for selecting for its output either the output of said left shift circuit or said sampled input signal;
   a digital inverter circuit receiving the output of said first multiplexor;
   a second multiplexor for selecting for its output either the output of said digital inverter circuit or the output of said first multiplexor;
   means for controlling said multiplexor selection so as to effectuate multiplication of said sampled input signal by the cosine function.

6. The circuit of claim 5 further including a circuit for dividing the output of said second multiplexor circuit in half.

7. A digital sine multiplication circuit comprising:
   a multiplexor for selecting for its output one of three choices of input selected from the group consisting of an inverted signal input, a non-inverted signal input and zero; and
   a multiplexor controller which controls selection sequencing for said multiplexor so as to effectuate multiplication by the sine function.

8. The circuit of claim 7 further including a circuit for scaling the output of said multiplexor so that said sine multiplication is by a sine function with unit amplitude.

9. A digital cosine multiplication circuit comprising:
   a first multiplexor for selecting between shifted and non-shifted versions of an input digital signal;
   an inverter receiving the selected output from said inverter and the output from said first multiplexor;
   a second multiplexor having as inputs the output from said inverter and the output from said first multiplexor; and
   a multiplexor controller which controls output selection for said first and second multiplexors so as to effectuate multiplication by the cosine function.

\* \* \* \* \*